April 18, 1961 F. L. FINA, JR 2,980,443
STEERING MECHANISM FOR VEHICLE ATTACHED TOOL
Filed Sept. 29, 1959 3 Sheets-Sheet 1

Fil L. Fina, Jr.
INVENTOR.

BY *Clarence A. O'Brien*
*and Harvey B. Jacobson*
Attorneys

April 18, 1961  F. L. FINA, JR  2,980,443
STEERING MECHANISM FOR VEHICLE ATTACHED TOOL
Filed Sept. 29, 1959  3 Sheets-Sheet 2

Fil L. Fina, Jr.
INVENTOR.

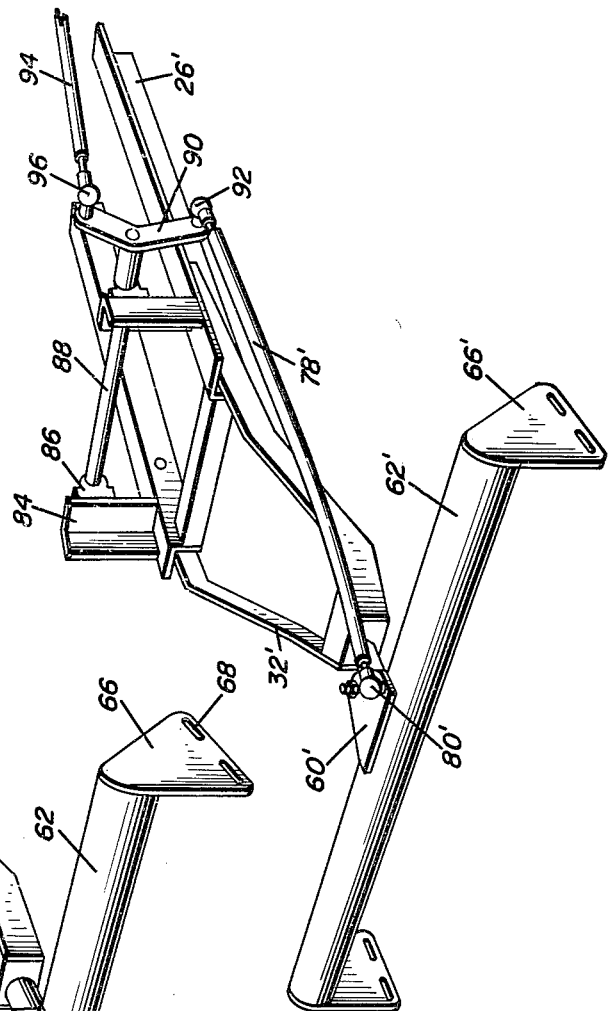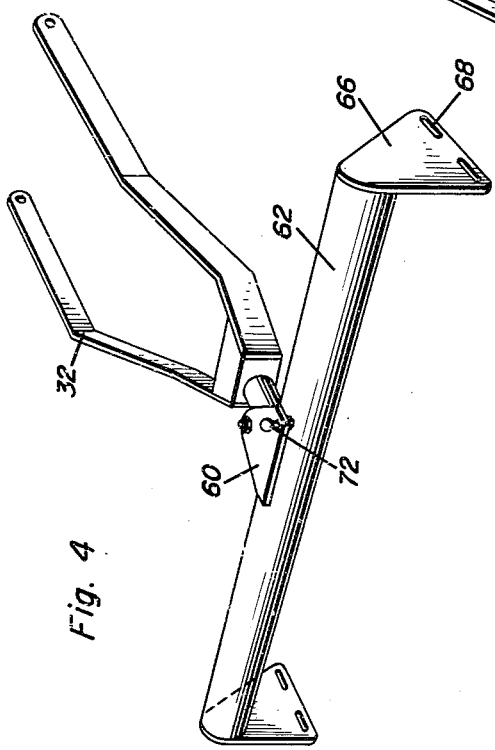

United States Patent Office 2,980,443
Patented Apr. 18, 1961

2,980,443
STEERING MECHANISM FOR VEHICLE ATTACHED TOOL

Fil L. Fina, Jr., Saratoga Springs, N.Y., assignor to Capitol Equipment Inc., a corporation of New York Filed Sept. 29, 1959, Ser. No. 843,133

5 Claims. (Cl. 280—467)

The present invention generally relates to attachment for wheeled prime movers such as but not limited to tractors and more particularly to such tools that are mounted forwardly of such a prime mover in which the tool itself is provided with ground engaging mechanisms for supporting its own weight.

The primary object of the present invention is to provide means for articulately connecting the prime mover and the front mounted tool together with means connected to the steering mechanism of the prime mover and to the tool for steering the tool in accordance with movement of the front steerable wheels of the prime mover thereby steering the tool in proportion to and in accordance with the steering control of the prime mover.

Another object of the present invention is to provide a front mounted tool for a prime mover having front steerable wheels together with a mechanism interconnecting the steering mechanism for the prime mover and supporting wheels, rollers, skids or the like of the tool for steering the tool or its supporting mechanism in coordination with and proportionally to the steerable wheels of the prime mover so that the wheels or other supporting mechanism of the tool are always rolling in the direction of travel and never skidding sidewise thereby limiting the strain and damage to the tool and its supporting mechanisms as well as the prime mover and also eliminating damage to the terrain or soil on which the device is being operated.

Yet another feature of the present invention is to provide a front mounted tool having supporting wheels or the like together with a connection between the tool and the steering mechanism for steering or turning the tool about an articulate connection to the prime mover for steering or turning the tool in the direction of turning of the prime mover.

A further object of the present invention is to provide a front mounted tool steerably controlled in response to movement of the steerable wheels of a prime mover to which the tool is attached with the structure being relatively simple in construction, easy to attach to existing prime movers such as farm tractors or the like, effective in operation and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a perspective view of the supporting mechanism for the front mounted tool illustrating the mechanism for attachment to the prime mover; and Figure 5 is a perspective view of a modified form of attachment for pivoting the tool in relation to pivotal movement of the steerable wheels of the prime mover.

Figure 1:
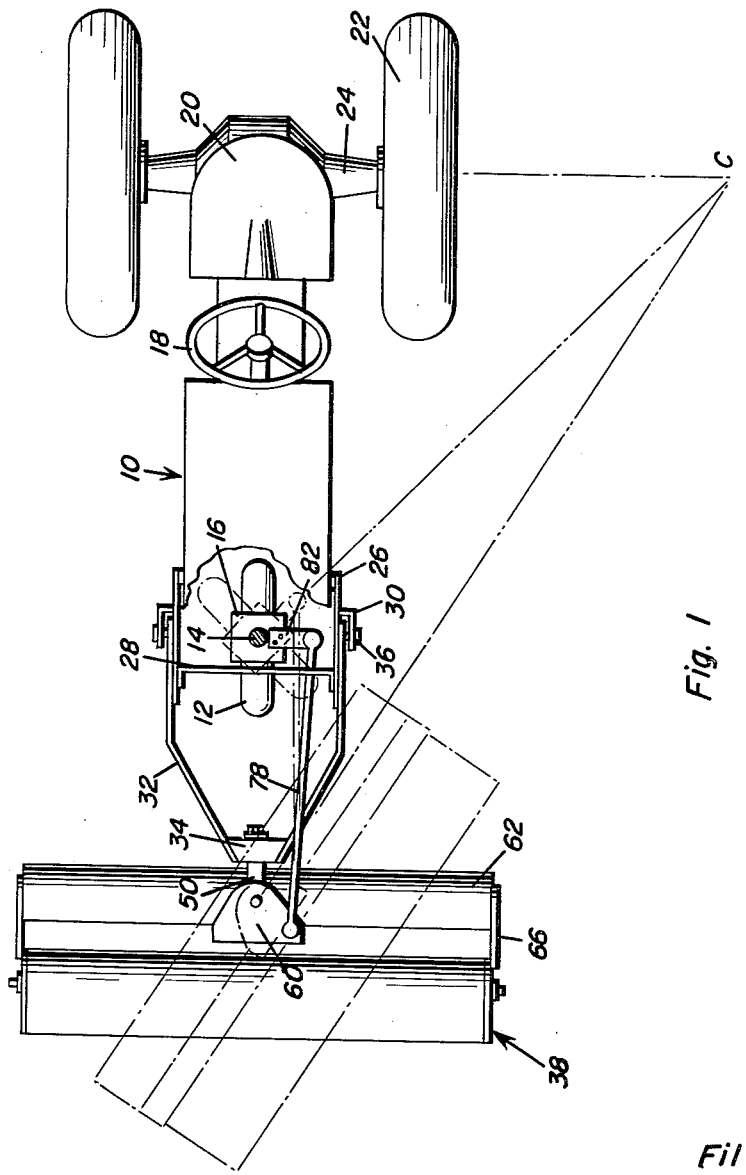
Figure 1 is a top plan view of a front mounted tool and tractor combination employing the interconnection of the present invention illustrating the manner in which the tool is pivoted in coordination with and proportionally to the pivotal movement of the front wheel of the tractor.

Referring now specifically to the drawings, the numeral 10 generally designates the prime mover which may conveniently be in the form of a tractor although the present invention is not specifically limited to any particular type of vehicle or prime mover. The prime mover 10 employs a steerable front wheel or wheels 12 pivotally mounted for swinging movement about a vertical axis defined by the vertical shaft 14 to which is attached a plate 16 for rotational movement or pivotal movement with the wheel 12. The tractor 10 is also provided with the usual control wheel or steering wheel 18 for controlling movement of the steerable wheel or wheels 12 in the usual manner. The tractor also is provided with the usual opertor's seat 20, driving wheels 22, axle housings 24 and other structure conventionally provided on farm tractors.

Figure 2:
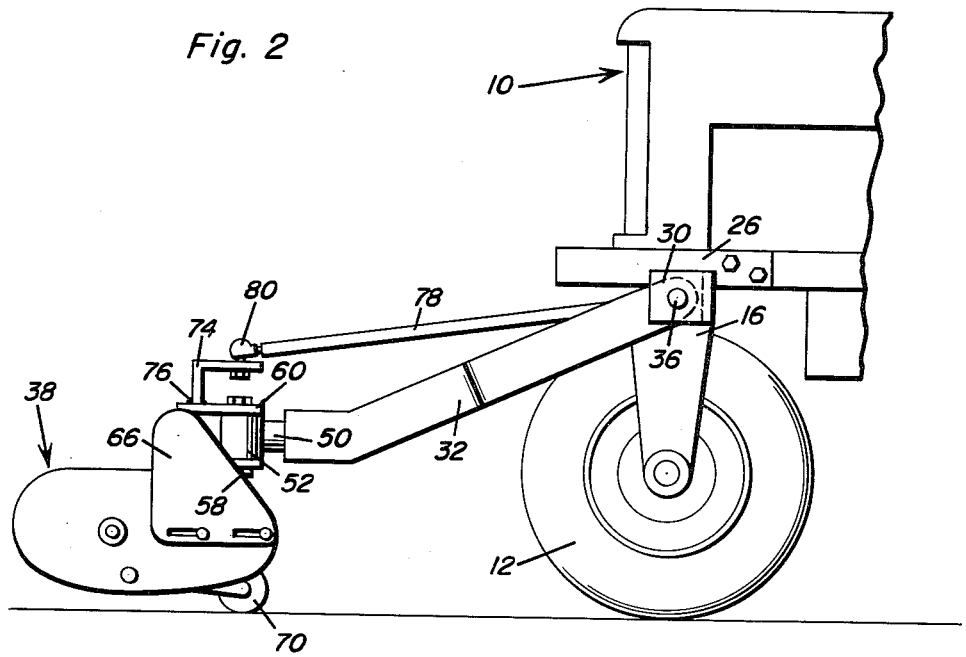
Figure 2 is a side elevation of the construction of the front tool and the forward portion of the tractor or prime mover.
Figure 3:
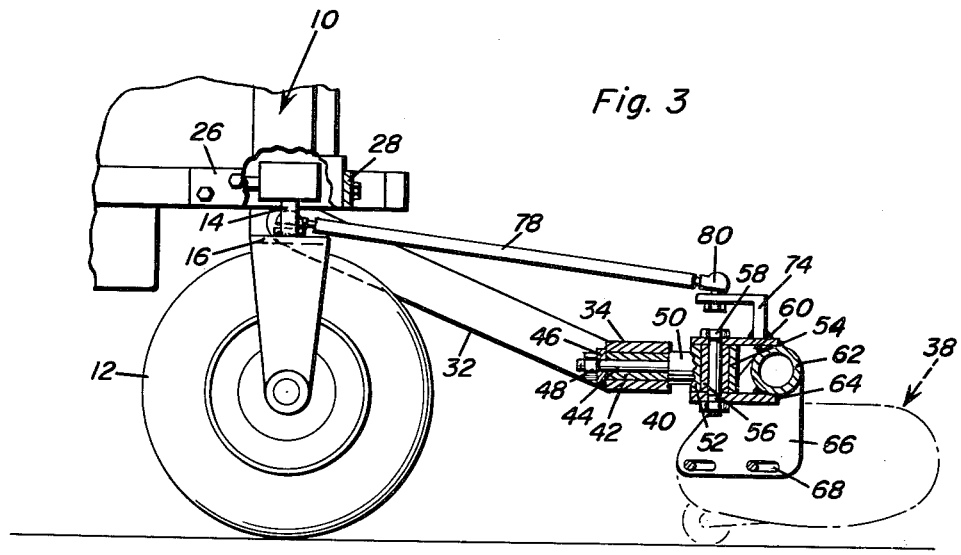
Figure 3 is a side elevational view similar to Figure 2 but taken from the other side with portions of the tool and the articulate connection being broken away together with portions of the tractor being broken away for illustrating the structural relationship of the component parts of the invention.

Attached to the tractor 10 in any suitable manner are two mounting frame members or brackets 26 interconnected by a transverse brace member 28. Each of the frame members 25 is provided with a forwardly extending offset lug 30 which receives the rear end of a pair of drive bars or force transmitting bars 32 which may be any suitable structural elements which bars 32 extend forwardly and converge and have the forward ends thereof interconnected by a block 34. The rear end of the drive bars 32 are pivotally connected to the frame members 26 and the lugs 30 by pivot shafts 36 which permit the drive bars 32 to swing in a vertical plane about a transverse axis defined by the pivot shafts 36 which may be in the form of removable pins, bolts or the like. As illustrated in Figure 2, the lugs 30 are disposed below the frame members 26 and the drive bars 32 serve to transmit the thrust from the tractor to the tool which is designated generally by the numeral 38. The drive bars 32 also locate the tool 38 laterally with respect to the tractor and are pivotally mounted to the frame members 26 to allow the tool 38 to vertically follow the contour of the terrain on which it is operating.

The bearing block 34 which interconnects the forward ends of the drive bars 32 is provided with a longitudinal bore 40 therein which receives a cylindrical bearing 42 journaling a shaft 44 having a retaining washer 46 and a screw threaded nut 48 on the inner end thereof and being provided with an enlargement 50 on the outer end thereof which abuttingly engages the outer end of the block 34 thus preventing longitudinal movement of the shaft 44 in relation to the block 34 while permitting rotation thereof about a substantially longitudinal axis of the shaft 44. The forwardmost end of the enlargement 50 forms a vertical cylindrical member 52 having a vertical cylindrical bore 54 extending therethrough receiving a bushing type bearing 56 which receives a pivot bolt 58 therethrough.

Connected to the pivot bolt 58 is a pair of horizontally disposed and vertically displaced plates 60 which are rigidly attached to the transversely extending tubular member 62 which is of cylindrical shape and which may conveniently be in the form of a pipe. The plates 60 are welded or otherwise rigidly secured to the pipe 62 as by welding 64 whereby the pipe 62 may swing about a horizontal longitudinal axis formed by the shaft 44 and also swing about a vertical axis formed by the bolt 58. The outer ends of the pipe 62 are each provided with vertically disposed depending plates 66 rigidly affixed thereto with the plates generally being triangular in shape with the pipe 62 disposed at one corner thereof and with an opposite horizontal edge of the plates 66 being provided with a pair of longitudinally aligned slots 68 for connection to the tool 38 which in this instance is a mower but which may be any suitable tool with it being necessary that the tool 38 have supporting wheels 70 or the like although the supporting mechanism may be in the form of wheels, rollers, skids or the like for carrying the weight of the tool combined with the weight of the pipe 62, drive bars 32 and related structural features.

The shaft 44 permits the tool to follow the transverse contour of the terrain over which it is operating and the bolt 58 acts as a king bolt for permitting steering movement of the tool. All of the bolts, nuts and the like may be locked by suitable locking devices such as cotter pins or the like.

The uppermost of the plates 60 is provided with an upwardly extending spherical ball 72 mounted on an L-shaped bracket 74 welded to the uppermost plate 60 as by welding 76. Connected to the spherical ball 72 is a tie rod 78 having a socket 80 on the forward end thereof for connection with the spherical ball 72. The inner end of the tie rod 78 is connected with a corresponding ball carried by the outer end of a laterally extending arm 82 on the plate 16 pivotal with the front steerable wheel 12. The tie rod 78 and the sockets on the ends thereof and the spherical members on the plate 16 and plate 60 respectively permits the tool to move in a vertical plane in relation to the prime mover or tractor 10 and may be considered somewhat similar to a tie rod and tie rod ends such as is employed in automotive vehicle structures for controlling the steerable front wheels thereof.

As will be apparent from Figure 1, the tool 38 is steered in geometrical relationship with the tractor 10 by the mechanical linkage. This feature, of course, is the primary purpose of the invention because it allows the tool to roll on its wheels or rollers when the tractor is turning. Without this feature, the wheels or rollers would be forced to skid when the entire combination is being turned. The steering of the tool is accomplished by the mechanical linkage consisting of the ball joints and steering rod or link which joins the steering linkage of the tractor to the frame portion of the tool in spaced relation to the king bolt 58. The connecting attachment between the steering linkage of the tractor and the steering link 78 may vary depending on the particular steering mechanism of the tractor. The exact location of the ball joint on the tool frame is geometrically computed for each application. In Figure 1, the front steerable wheel 12, the front mounted tool 38 and the steering connection means of this invention are shown in broken lines in position for a left turn of the combination tractor and tool with the center of the turning circle indicated at point C. The convergence of the axis of all wheels of the combination tractor and tool to the single point C is geometrical proof that all of the wheels are tracting and are in pure rolling motion. In other words, the mechanism in this invention causes the axis of all wheels of the combination and articulately connected prime mover and tools to converge and intersect at a single point at any position of the steerable wheels of the prime mover.

Figure 5 illustrates another form of the invention for attachment to a prime mover or tractor having a different type of steering mechanism. In this form of the invention, the frame rails 26' are each provided with upstanding members 84 each having a bearing block 86 thereon supporting a transverse shaft 88 having a bell crank 90 mounted on the outer end thereof which is disposed outwardly of the frame member 26'. The bell crank 90 has one end of the steering crank or rod 78' connected thereto by a ball and socket connection 92 while the upper end of the bell crank 90 is connected to a rear link 94 by virtue of a ball and socket joint 96. The rear end of the rear steering link 94 may be provided with a ball joint connection to the steering mechanism of the prime mover (not illustrated).

In both forms of the invention, the orientation of the ball and socket joints in relation to the bell crank or arm to which it is attached is geometrically computed so that the steering movement of the tool is proportional to the steering movement of the steerable wheel or wheels of the prime mover so that the axis of rotation of all of the wheels of the combination prime mover and tool will converge to a single point so that all of the wheels, rollers, skids or the like will track and move in a pure circular path about the single point without any radial or side movement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination of a prime mover having front steerable wheel means, a steering mechanism for moving and controlling said steerable wheel means, a tool including a frame mounted forwardly of the prime mover and including ground engaging support means carrying the weight of the tool, and means connecting the tool frame to the prime mover for pivotal steering movement about an axis substantially parallel to the pivotal axis of the front steerable wheel means on the prime mover, and means interconnecting the tool frame and the steering mechanism of the prime mover for pivoting the tool frame in accordance with and proportionally to the prime movers steerable wheel means, said means connecting the tool frame to the prime mover including a longitudinally extending and normally horizontal pivot bolt for permitting the tool to follow the transverse variations in the terrain.

2. The structure as defined in claim 1 wherein said means connecting the tool frame to the prime mover also includes means permitting vertical movement of the tool in substantially a vertical plane for permitting the tool to follow longitudinal variations in the terrain which it traverses.

3. The structure as defined in claim 2 wherein said means interconnecting the tool frame and the steering mechanism of the prime mover includes an elongated steering link connected to the tool frame for universal movement in relation thereto and in laterally spaced relation to the vertical axis of pivotal movement of the tool frame, the other end of said link including means connected to the steering mechanism of the prime mover for movement of the tool frame in response to movement of the steering mechanism and the steerable wheel means of the prime mover, said link being connected to the steering means in such a manner that all of the ground engaging means of the combined prime mover and tool will move about a single point when propelled so that all of the ground engaging components will move in a circular path about a single center.

4. For use in combination with a prime mover having steerable front wheels, a tool, ground engaging means on the tool for supporting the weight thereof, means on the tool adapted to connect to the prime mover for vertical swinging movement of the tool, said means including a pair of thrust bars adapted to be pivotally connected to the prime mover for vertical swinging movement, means at the forward ends of the thrust bars for connecting the tool thereto for swinging movement of the tool about a vertical axis and for swinging movement of the tool about a horizontal axis for permitting the tool to follow the terrain, and means conneced to the tool in spaced relation to the vertical axis and adapted to be operated in response to pivotal movement of the steerable wheels of the prime mover thereby pivoting the tool about a vertical axis in response to pivotal movement of the steerable wheels of the prime mover.

5. The structure as defined in claim 4 wherein said means interconnecting the thrust bars and the tool include a pair of plates mounted on the tool, a cylindrical bearing knuckle mounted on the thrust bars and received between the plates, and a vertical king bolt extending through the plates and knuckle thereby forming the means for permitting swinging movement of the tool about a vertical axis.

References Cited in the file of this patent

UNITED STATES PATENTS

| | | |
|---|---|---|
| 1,876,568 | Carlson | Sept. 13, 1932 |
| 2,735,253 | Huddle | Feb. 21, 1956 |

FOREIGN PATENTS

| | | |
|---|---|---|
| 662,151 | Great Britain | Dec. 5, 1951 |
| 809,926 | Great Britain | Mar. 4, 1959 |
| 531,438 | Italy | Aug. 2, 1955 |